United States Patent
Euvino, Jr. et al.

(10) Patent No.: US 7,950,899 B2
(45) Date of Patent: May 31, 2011

(54) MODULAR FAN INLET CASE

(75) Inventors: Frank J. Euvino, Jr., Naugatuck, CT (US); David R. Lyders, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 1222 days.

(21) Appl. No.: 11/140,789

(22) Filed: May 31, 2005

(65) Prior Publication Data
US 2006/0269405 A1 Nov. 30, 2006

(51) Int. Cl.
*F03B 11/02* (2006.01)

(52) U.S. Cl. ............... 415/208.1; 415/200; 415/220; 416/230

(58) Field of Classification Search ......... 415/208.1, 415/220, 200; 416/230
See application file for complete search history.

(56) References Cited

U.S. PATENT DOCUMENTS

| | | |
|---|---|---|
| 2,594,118 A | 4/1952 | Boyd |
| 3,084,849 A * | 4/1963 | Dennison ............ 415/175 |
| 3,269,700 A | 8/1966 | Shainess |
| 3,758,234 A * | 9/1973 | Goodwin ............ 416/230 |
| 3,886,647 A * | 6/1975 | Alexander ........... 416/230 |
| 4,055,041 A * | 10/1977 | Adamson et al. ....... 415/196 |
| 4,655,682 A * | 4/1987 | Kunz et al. ........... 415/119 |
| 4,820,117 A * | 4/1989 | Larrabee et al. ....... 415/142 |
| 4,993,918 A | 2/1991 | Myers et al. |
| 5,483,792 A * | 1/1996 | Czachor et al. ........ 60/796 |
| 5,525,035 A | 6/1996 | Ben-Porat et al. |

FOREIGN PATENT DOCUMENTS

| | | |
|---|---|---|
| DE | 19852603 | 5/2000 |
| EP | 0298898 | 1/1989 |
| EP | 0884469 | 12/1998 |
| GB | 2262573 | 6/1993 |

OTHER PUBLICATIONS

European Search Report dated Aug. 14, 2009.

* cited by examiner

*Primary Examiner* — Igor Kershteyn
(74) *Attorney, Agent, or Firm* — Carlson, Gaskey & Olds, PC

(57) ABSTRACT

A modular fan inlet case includes a center ring, an outer ring, and a plurality of struts each coupled at a first end to the center ring, and at a second end to the outer ring. A plurality of shell members are each configured to be removably coupled to a corresponding strut. Preferably, the plurality of shell members each define a longitudinal groove for being received onto the corresponding strut.

5 Claims, 1 Drawing Sheet

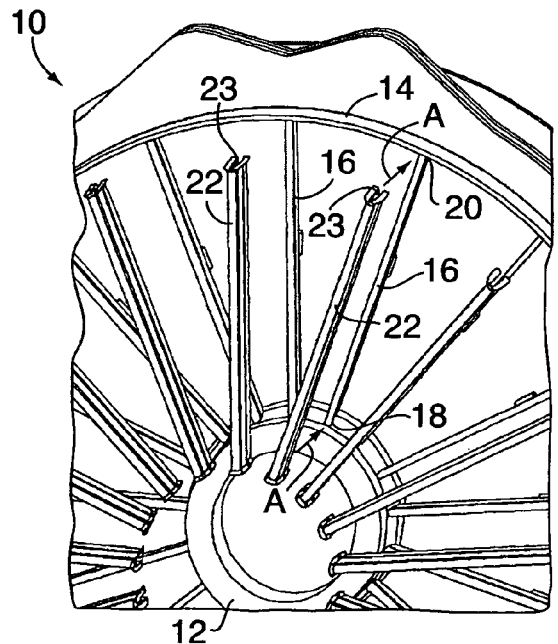
FIG. 1
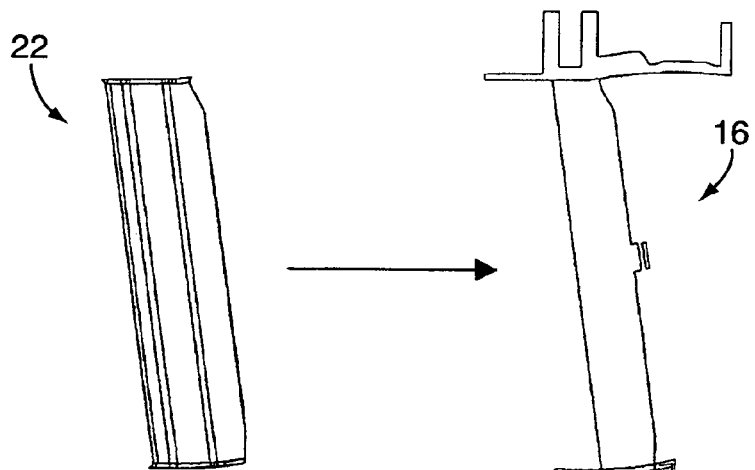
FIG. 2A
FIG. 2B
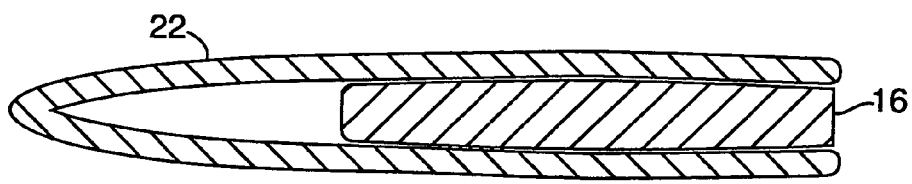
FIG. 3

MODULAR FAN INLET CASE

This invention was made with Government support under N00019-02-C-3003 awarded by the United States Navy. The Government has certain rights in this invention.

FIELD OF THE INVENTION

This invention relates generally to aircraft engines, and more particularly to fan inlet cases for aircraft engines.

BACKGROUND OF THE INVENTION

Prior fan inlet cases typically use organic matrix composite, resin transfer molding for lightweight and low cost capabilities, as well as other performance enhancing characteristics. Although significantly less costly than titanium cases, the inlet case still represents a sizeable portion of the cost of a fan module. To provide full life capability, certain measures are required. Fluoroelastomer erosion coatings are required to ensure that sand and dust ingestion does not affect any structural plies. Additional structural material is designed into the component to provide for full capability after a foreign object damage event. Also, repair and blending limits and processes need to be designed, analyzed and communicated to the customer.

It is an object of the present invention to provide a low cost means to maintain, modify, update or replace the aerodynamic strut surfaces of a fan inlet case component without modification to the primary structural portion of the component.

SUMMARY OF THE INVENTION

A modular fan inlet case embodying the present invention comprises a center ring, an outer ring, and a plurality of struts each coupled at a first end to the center ring, and at a second end to the outer ring. A plurality of shell members are each configured to be removably coupled to a corresponding strut. Preferably, the plurality of shell members each define a longitudinal groove for being received onto a corresponding strut.

BRIEF DESCRIPTION OF THE DRAWINGS

FIG. 1 is a perspective view of a modular fan inlet case embodying the present invention.

FIG. 2A is an elevational view of a shell member configured to be coupled to a structural fan inlet case strut in accordance with the present invention.

FIG. 2B is an elevational view of a structural fan inlet case strut in accordance with the present invention.

FIG. 3 is a cross-sectional view of an installed shell member of a structural fan inlet case in accordance with the present invention.

DETAILED DESCRIPTION OF THE PREFERRED EMBODIMENT

With reference to FIGS. 1-3, a modular fan inlet case embodying the present invention is generally indicated by the reference number 10. The case 10 comprises a center ring 12, an outer ring 14 and a plurality of struts 16 each preferably fabricated at least in part from an organic matrix composite. The struts 16 are each coupled at a first end 18 to the center ring and at a second end 20 to the outer ring to thereby form a structural ring-strut-ring inlet case component.

A structural ring-strut-ring inlet case component housing a bearing compartment, a forward engine attachment to an airframe, and attachment of fan inlet guide vanes is manufactured using low cost lightweight methods such as, for example, organic matrix composite, resin transfer molding. A plurality of shell members 22 are preferably fabricated at least in part from an organic matrix composite. The shell members 22 are each configured to be removably coupled to a corresponding strut 16 to form aerodynamic surfaces on the struts. For example, the shell members 22 each define a longitudinal groove 23 which is placed over a corresponding strut 16 (as shown by arrows A-A in FIG. 1) to removably couple the shell member to the strut. The shell members 22 can be easily replaced if damaged, worn, aero/structural iteration on the module occurs, or other performance factors change. The center ring 12, outer ring 14 and the plurality of struts 16 serve as a structural backbone to the modular fan inlet case 10 and generally remain unchanged. The modular fan inlet case 10, however, allows for easy replacement of the shell members 22 when damaged or worn without major disassembly of the modular fan inlet case.

The present invention allows the modular fan inlet case 10, in which the majority of the cost is associated, to be out of the environment that will cause erosion or foreign object damage events to occur. The shell members 22 can be designed to suit requirements such as: inexpensive replaceable components, for a system design and development phase where aero or performance changes are likely, or full life components, in a learned out production environment. The modular design also allows for tailoring performance for different customers, missions, or foreign sales as appropriate.

As will be recognized by those of ordinary skill in the pertinent art, numerous modifications and substitutions can be made to the above-described embodiment of the present invention without departing from the scope of the invention. Accordingly, the preceding portion of this specification is to be taken in an illustrative, as opposed to a limiting sense.

What is claimed is:

1. A modular fan inlet case, comprising:
   a center ring;
   an outer ring;
   a plurality of struts each coupled at a first end to said center ring, and at a second end to said outer ring; and
   a plurality of protective shell members, each protective shell member covering a substantial portion of a corresponding strut between said center and said outer rings and being configured to be removably coupled to said corresponding strut, and wherein said plurality of protective shell members each define a longitudinal groove for being received onto a corresponding strut.

2. A modular fan inlet case, comprising:
   a center ring fabricated at least in part from an organic matrix composite;
   an outer ring;
   a plurality of struts each coupled at a first end to said center ring, and at a second end to said outer ring; and
   a plurality of protective shell members, each protective shell member covering a substantial portion of a corresponding strut between said center and said outer rings and being configured to be removably coupled to said corresponding strut.

3. A modular fan inlet case, comprising:
   a center ring;
   an outer ring fabricated at least in part from an organic matrix composite;
   a plurality of struts each coupled at a first end to said center ring, and at a second end to said outer ring; and a plurality of protective shell members, each protective shell member covering a substantial portion of a corresponding strut between said center and said outer rings and being configured to be removably coupled to said corresponding strut.

4. A modular fan inlet case, comprising:

a center ring;

an outer ring;

a plurality of struts each coupled at a first end to said center ring, and at a second end to said outer ring, and wherein said plurality of struts are fabricated at least in part from an organic matrix composite; and a plurality of protective shell members, each protective shell member covering a substantial portion of a corresponding strut between said center and said outer rings and being configured to be removably coupled to said corresponding strut.

5. A modular fan inlet case, comprising:

a center ring;

an outer ring;

a plurality of struts each coupled at a first end to said center ring, and at a second end to said outer ring; and a plurality of protective shell members that are each fabricated at least in part from an organic matrix composite, each protective shell member covering a substantial portion of a corresponding strut between said center and said outer rings and being configured to be removably coupled to said corresponding strut.

* * * * *